US006993292B2

(12) United States Patent
Sabongi et al.

(10) Patent No.: US 6,993,292 B2
(45) Date of Patent: Jan. 31, 2006

(54) SELF-MONITORING RADIO NETWORK

(75) Inventors: Gebran J. Sabongi, Woodbury, MN (US); Ronald W. Hall, South St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 167 days.

(21) Appl. No.: 10/085,480

(22) Filed: Feb. 26, 2002

(65) Prior Publication Data

US 2003/0162504 A1 Aug. 28, 2003

(51) Int. Cl.
*H04B 17/00* (2006.01)

(52) U.S. Cl. .................... 455/67.11; 455/67.13; 455/67.7; 455/423; 455/424; 455/425

(58) Field of Classification Search ............ 455/67.11, 455/67.13, 67.7, 423, 424, 425
See application file for complete search history.

(56) References Cited

U.S. PATENT DOCUMENTS

| 299,288 | A | 5/1884 | Stewart |
| 303,553 | A | 8/1884 | Barnard |
| 1,182,896 | A | 5/1916 | Davison |
| 1,699,127 | A | 1/1929 | Wacker |
| 2,486,267 | A | 10/1949 | Dullinsky |
| 3,031,537 | A | 4/1962 | Rose |
| 3,101,155 | A | 8/1963 | Lehr et al. |
| 3,167,619 | A | 1/1965 | Palmaer |
| 3,306,991 | A | 2/1967 | Wood |
| 3,461,463 | A | 8/1969 | Beguin |
| 3,769,095 | A | 10/1973 | Schmidt |
| 3,906,160 | A | 9/1975 | Nakamura et al. |
| 3,977,907 | A | 8/1976 | Roth et al. |

(Continued)

FOREIGN PATENT DOCUMENTS

| CH | 244196 | 3/1947 |
| DE | 19802659 | 7/1999 |
| DE | 10024041 | 12/2000 |
| DE | 20114127 | 11/2001 |
| EP | 0019838 A1 | 5/1980 |

(Continued)

OTHER PUBLICATIONS

"Ultraplex™System" brochure, *Panasonic*, 2 pages (believed to have been on sale before Jan. 15, 2001, .
"3M Model C960/C860 Wireless Intercom System" headset programming instructions, 1 page, 3M Food Services Trade Department, publ. 78–6912–0669–8 Rev. D, 2002.
"3M Headset Intercom Systems Model C860/C960/ C960SL/C1025" installation instructions, 3M Commerical Care Division, publ. 78–6912–6–0672–2 Rev. H, Oct. 2003.
"3M Belt Pack Intercom System Model C860" operating instructions, 3M Food Services Trade Department, publ. 78–6912–0692–0 Rev. A, Nov. 2000.
"3M Headset Intercom System Model C960" operating instructions, 3M Food Services Trade Department, publ 78–6912–0671–4 Rev. F, May 1999.

(Continued)

*Primary Examiner*—Vivian Chin
*Assistant Examiner*—Minh D. Dao
(74) *Attorney, Agent, or Firm*—Stephen W. Buckingham

(57) ABSTRACT

A scheme of identifying nonfunctional two-way radios from among a known group of two-way radios expected to be operating within a region may include establishing a corresponding window of time for each of the two-way radios expected to be operating within the region. For each of the established windows of time, a transmission from the corresponding radio is awaited. If, for a particular radio, no transmission is detected within its corresponding window of time, the absence of the transmission is recorded. Finally, if, for a particular radio, the number of times absence of transmission has been recorded exceeds a threshold, the particular radio is identified as nonfunctional.

28 Claims, 11 Drawing Sheets

U.S. PATENT DOCUMENTS

| | | | |
|---|---|---|---|
| 4,027,113 A | 5/1977 | Matsumoto et al. | |
| 4,117,203 A | 9/1978 | Sjogren | |
| 4,125,681 A | 11/1978 | Sjogren | |
| 4,278,852 A | 7/1981 | Gorike | |
| 4,323,156 A | 4/1982 | Grueneberg | |
| D264,961 S | 6/1982 | Oxenreider | |
| 4,409,442 A | 10/1983 | Kamimura | |
| 4,431,717 A | 2/1984 | Kikuchi | |
| 4,482,745 A | 11/1984 | Maulding | |
| 4,484,029 A | 11/1984 | Kenney | |
| 4,517,413 A | 5/1985 | Pavitt | |
| 4,591,661 A | 5/1986 | Benedetto et al. | |
| 4,741,030 A | 4/1988 | Wilson | |
| D298,029 S | 10/1988 | Foster | |
| 4,815,143 A | 3/1989 | Derhaag | |
| 4,882,745 A | 11/1989 | Silver | |
| 4,882,770 A | 11/1989 | Miyahira | |
| 4,904,549 A | 2/1990 | Goodwin et al. | |
| 4,930,148 A | 5/1990 | Lee | |
| 4,977,610 A | 12/1990 | Kutz | |
| 5,027,433 A | 6/1991 | Menadier et al. | |
| 5,033,094 A | 7/1991 | Hung | |
| D321,500 S | 11/1991 | Fukuda | |
| D321,680 S | 11/1991 | Blount et al. | |
| 5,113,428 A | 5/1992 | Fitzgerald | |
| 5,117,464 A | 5/1992 | Jones et al. | |
| 5,117,465 A | 5/1992 | MacDonald | |
| 5,185,807 A | 5/1992 | Bergin et al. | |
| 5,121,243 A | 6/1992 | Miyahira | |
| 5,189,400 A | 2/1993 | Schultz | |
| 5,203,017 A | 4/1993 | Brooks | |
| 5,212,020 A | 5/1993 | Inobe | |
| 5,220,677 A * | 6/1993 | Brooks | 455/507 |
| 5,247,380 A | 9/1993 | Lee et al. | |
| 5,253,095 A | 10/1993 | Menadier | |
| D342,947 S | 1/1994 | Totsuka | |
| 5,295,191 A | 3/1994 | Van Vroenhoven | |
| 5,305,132 A | 4/1994 | Fasen | |
| 5,321,848 A | 6/1994 | Miyahira et al. | |
| 5,333,206 A | 7/1994 | Koss | |
| 5,347,387 A | 9/1994 | Rice | |
| 5,402,497 A | 3/1995 | Nishimoto et al. | |
| 5,405,716 A | 4/1995 | Yoshimatsu et al. | |
| D358,126 S | 5/1995 | Sakuma et al. | |
| D364,417 S | 11/1995 | Winston | |
| 5,491,839 A | 2/1996 | Schotz | |
| 5,508,123 A | 4/1996 | Fan | |
| 5,512,891 A | 4/1996 | Kang | |
| 5,530,763 A | 6/1996 | Aebi et al. | |
| D371,784 S | 7/1996 | Gertz | |
| 5,548,623 A * | 8/1996 | Casper et al. | 375/358 |
| 5,590,407 A | 12/1996 | Ishikawa et al. | |
| 5,590,417 A | 12/1996 | Rydbeck | |
| D377,477 S | 1/1997 | Harata et al. | |
| 5,608,612 A | 3/1997 | Hokao | |
| 5,621,384 A | 4/1997 | Crimmins et al. | |
| 5,621,662 A | 4/1997 | Humphries et al. | |
| 5,644,630 A | 7/1997 | Durco, Jr. | |
| 5,673,036 A * | 9/1997 | Gabrielle | 340/7.21 |
| 5,060,308 A | 10/1997 | Bieback | |
| D387,328 S | 12/1997 | Ueda | |
| 5,701,356 A | 12/1997 | Stanford | |
| 5,710,979 A * | 1/1998 | Tamai | 455/67.11 |
| D390,187 S | 2/1998 | Urvoy | |
| 5,721,775 A | 2/1998 | Leifer | |
| D393,624 S | 4/1998 | Shim | |
| D394,436 S | 5/1998 | Hall et al. | |
| 5,784,471 A | 7/1998 | Bebenroth | |
| 5,784,685 A | 7/1998 | Stanford et al. | |
| 5,794,127 A | 8/1998 | Lansang | |
| 5,798,931 A | 8/1998 | Kaehler | |
| D399,819 S | 10/1998 | Iida | |
| D400,160 S | 10/1998 | Nagano | |
| 5,582,300 A | 10/1998 | Addy et al. | |
| 5,825,896 A | 10/1998 | Leedom | |
| 5,828,300 A | 10/1998 | Addy et al. | |
| D400,494 S | 11/1998 | Blase | |
| D400,497 S | 11/1998 | Sabag et al. | |
| D400,849 S | 11/1998 | Ikeda et al. | |
| D402,955 S | 12/1998 | Smith et al. | |
| D403,298 S | 12/1998 | Hall et al. | |
| D403,299 S | 12/1998 | Smith et al. | |
| 5,869,204 A | 2/1999 | Kottke et al. | |
| 5,881,156 A | 3/1999 | Treni et al. | |
| D408,351 S | 4/1999 | Shim | |
| 5,895,728 A | 4/1999 | Walker et al. | |
| D409,559 S | 5/1999 | Shim | |
| D409,560 S | 5/1999 | Shim | |
| 4,754,230 A | 6/1999 | Schwartz | |
| 6,003,015 A | 12/1999 | Kang | |
| 6,004,689 A | 12/1999 | Walker et al. | |
| D419,131 S | 1/2000 | Andrews et al. | |
| 6,041,243 A | 3/2000 | Davidson | |
| 6,430,299 B1 | 3/2000 | Hall | |
| 6,054,920 A | 4/2000 | Smith et al. | |
| D409,975 S | 5/2000 | Zeller | |
| D432,982 S | 10/2000 | Miyashita | |
| 6,130,953 A | 10/2000 | Wilton et al. | |
| 6,148,175 A | 11/2000 | Freedland | |
| 6,157,908 A | 12/2000 | O'Gwynn | |
| 6,175,308 B1 | 1/2001 | Tallman et al. | |
| 6,230,214 B1 | 5/2001 | Liukkonen et al. | |
| 6,236,732 B1 | 5/2001 | Griffin | |
| 6,236,969 B1 | 5/2001 | Ruppert et al. | |
| 6,252,510 B1 | 6/2001 | Dungan | |
| D448,340 S | 9/2001 | Hall et al. | |
| 6,300,871 B1 | 10/2001 | Irwin et al. | |
| 6,311,071 B1 | 10/2001 | Voroba | |
| 6,323,785 B1 | 11/2001 | Nickell et al. | |
| 6,406,811 B1 | 6/2002 | Hall et al. | |
| 6,426,697 B1 | 7/2002 | Capowski et al. | |
| 6,512,832 B1 * | 1/2003 | Braun et al. | 381/81 |
| 6,522,765 B1 | 2/2003 | Towle | |
| 6,525,854 B1 | 2/2003 | Takahashi et al. | |
| 6,754,361 B1 | 6/2004 | Hall et al. | |
| 2002/0076060 A1 | 6/2002 | Hall | |
| 2002/0132585 A1 | 9/2002 | Palmero et al. | |
| 2002/0137466 A1 * | 9/2002 | Bamburak et al. | 455/62 |
| 2003/0013503 A1 | 1/2003 | Menard et al. | |
| 2003/0072358 A1 * | 4/2003 | Gurney et al. | 375/149 |
| 2003/0092453 A1 | 5/2003 | Mills et al. | |
| 2003/0134666 A1 | 6/2003 | Fletcher | |

FOREIGN PATENT DOCUMENTS

| | | |
|---|---|---|
| EP | 0389174 | 9/1990 |
| EP | 0676819 A2 | 10/1995 |
| EP | 0685894 A1 | 12/1995 |
| JP | 409283103 A | 10/1997 |
| JP | 1125017 | 9/1999 |
| WO | WO 89/06075 | 6/1989 |
| WO | WO 90/09726 | 8/1990 |
| WO | WO 90/11657 | 10/1990 |
| WO | WO 98/47311 | 10/1998 |
| WO | WO 99/60764 | 11/1999 |
| WO | WO 00/07176 | 2/2000 |
| WO | WO 01/78443 | 10/2001 |
| WO | WO 02/23932 | 3/2002 |
| WO | WO 03/061147 | 7/2003 |

"COM900BP Belt–Pac Communicator: Operating Instructions", HM Electronics, Inc. HME #400434–rev Aug. 30, 2000, pp. 1 and 1–8.

"COM400CC Communicator: Operating Instructions", HM Electronics, Inc. HME #400436–Rev Sep. 13, 2000. pp. 1 and 1–9.

* cited by examiner

SELF-MONITORING RADIO NETWORK

FIELD OF THE INVENTION

The invention relates generally to a radio network, and more particularly to a radio network capable of detecting the occurrence of malfunction in one of its constituent two-way radios.

BACKGROUND OF THE INVENTION

Radio networks are frequently deployed in commercial settings, such as retail stores, warehouses, or quick service restaurants. For example, a quick service restaurant may utilize a radio network to facilitate communication between a drive-through customer in a drive-through lane and an employee taking the customer's order. Such a radio network also permits the employees of the store to efficiently communicate with one another. In this context, the radio network is more commonly thought of as an "intercom system," with the two-way radios often taking the form of headsets, in which the microphone, speaker, and transceiver are affixed to a unit worn upon the employee's head. For the most part, such a communication scheme provides a relatively inexpensive and reliable form of communication for the employees.

The above-described scheme does possess one shortcoming of note, however. In the event that one of the two-way radios (i.e., one of the headsets) malfunctions, employees tend to set the malfunctioning unit aside in favor of a properly functioning unit. Often times, no record is made of the fact that a particular unit has ceased to function. Over time, the number of cast-aside units grows, until the particular retail setting (e.g., quick service restaurant) suddenly and unexpectedly finds itself with an insufficient number of radios for proper operation of the store/restaurant. Then, only after being spurred on by a crisis, all of the malfunctioning units are serviced, and the store/restaurant is returned to operability.

As is made evident from the above discussion, there is a need for a scheme by which the silent and unobserved accumulation of malfunctioning radios may be avoided. A desirable scheme would require the deployment of little additional hardware, require minimal re-design of existing components of radio networks, and would be relatively inexpensive to deploy.

SUMMARY OF THE INVENTION

Against this backdrop, the present invention has been created. A method of identifying nonfunctional two-way radios from among a known group of two-way radios expected to be operating within a region may include establishing a corresponding window of time for each of the two-way radios expected to be operating within the region. For each of the established windows of time, a transmission from the corresponding radio is awaited. If, for a particular radio, no transmission is detected within its corresponding window of time, the absence of the transmission is recorded. Finally, if, for a particular radio, the number of times absence of transmission has been recorded exceeds a threshold, the particular radio is identified as nonfunctional.

According to another embodiment of the invention, a two-way radio may be improved so as to render its operability observable. Such a two-way radio may include an antenna for receiving and broadcasting transmissions. Additionally, it may include a transceiver unit coupled to the antenna. The transceiver unit modulates a carrier signal with a signal to be transmitted and recovers a baseband signal from a received transmission. The radio may also include a microprocessor coupled to the transceiver unit. The microprocessor is programmed to command a broadcast of a transmission containing a code identifying the radio, at a designated point in time. Prior to the broadcast of the transmission containing the identification code, a transmission protocol governing subsequent transmissions is known by the radio.

According to yet another embodiment of the invention, a wireless intercom system may include a first two-way radio fashioned as a headset. The system may also include a second two-way radio fashioned as a headset. Additionally, the system may include a repeater unit. Transmissions from the first and second two-way radio may occur upon a first carrier frequency. The first and second two-way radios may receive transmissions carried upon a second carrier frequency. The repeater unit may receive transmission carried upon the first carrier frequency, and may broadcast transmissions upon the second carrier frequency, thereby enabling the first and second two-way radios to communicate. The repeater unit may establish a first window of time corresponding to the first radio and a second window of time corresponding to the second radio. The repeater unit may await a transmission from the first radio during the first window of time, and may await a transmission from the second radio during the second window of time. The repeater unit may record absence of transmission from the first radio, if no transmission is received from the first radio during the first window of time. The repeater unit may record absence of transmission from the second radio, if no transmission is received from the second radio during the second window of time. The repeater unit may identify the first radio as nonfunctional if the number of times absence of transmission by the first radio has been recorded exceeds a threshold. Finally, the repeater unit may identify the second radio as nonfunctional if the number of times absence of transmission by the second radio has been recorded exceeds a threshold.

DETAILED DESCRIPTION OF THE INVENTION

A radio network may be made to observe and record inactivity on the part of radios within the network. Employing the assumption that prolonged inactivity of a particular radio may indicate its nonfunctionality, the network may utilize a threshold, whereby a radio is deemed nonfunctional if it is inactive for a length of time exceeding the threshold.

Radio activity may be observed by a listening device. The listening device may establish a window of time during which it expects to receive a transmission from a particular radio. If the window of time elapses without the listening device receiving a transmission from the particular radio, the absence of such a transmission is recorded.

Subsequently, the listening device opens another window of time during which a transmission from the particular device is awaited. Once again, if the window of time elapses without a transmission from the particular radio, the omission is again recorded. If the number of recorded absences of transmission exceeds a threshold, the particular radio is declared nonfunctional.

Optionally, the listening device may be made to automatically contact a repair service, and schedule the nonfunctional radio for service. In another optional embodiment, the listening device may be made to receive alarm signals from auxiliary devices (such as an over-temperature sensor on a freezer). In response to an alarm signal from the auxiliary device, the listening device may contact an appropriate repair service.

The following disclosure describes the invention with reference to a radio network in which a plurality of two-way radios communicate with one another via a repeater. Each two-way radio broadcasts upon a first frequency using frequency modulation (FM) transmission; each radio receives FM transmissions carried on a second frequency. A repeater is used to receive transmissions carried on the first frequency and rebroadcast those transmissions on the second frequency. The radio communication is half-duplex, and no form of multiplexing is employed. Although the invention is described with reference to such a network, none of these features are critical to the invention. The invention is susceptible to deployment within a radio network employing any form of modulation and any form of multiplexing (including frequency domain multiplexing, time domain multiplexing, and code division multiple access). Additionally, the invention may be deployed in a network employing full or half duplex communication. The invention need not be embodied within the repeater.

Figure 1:
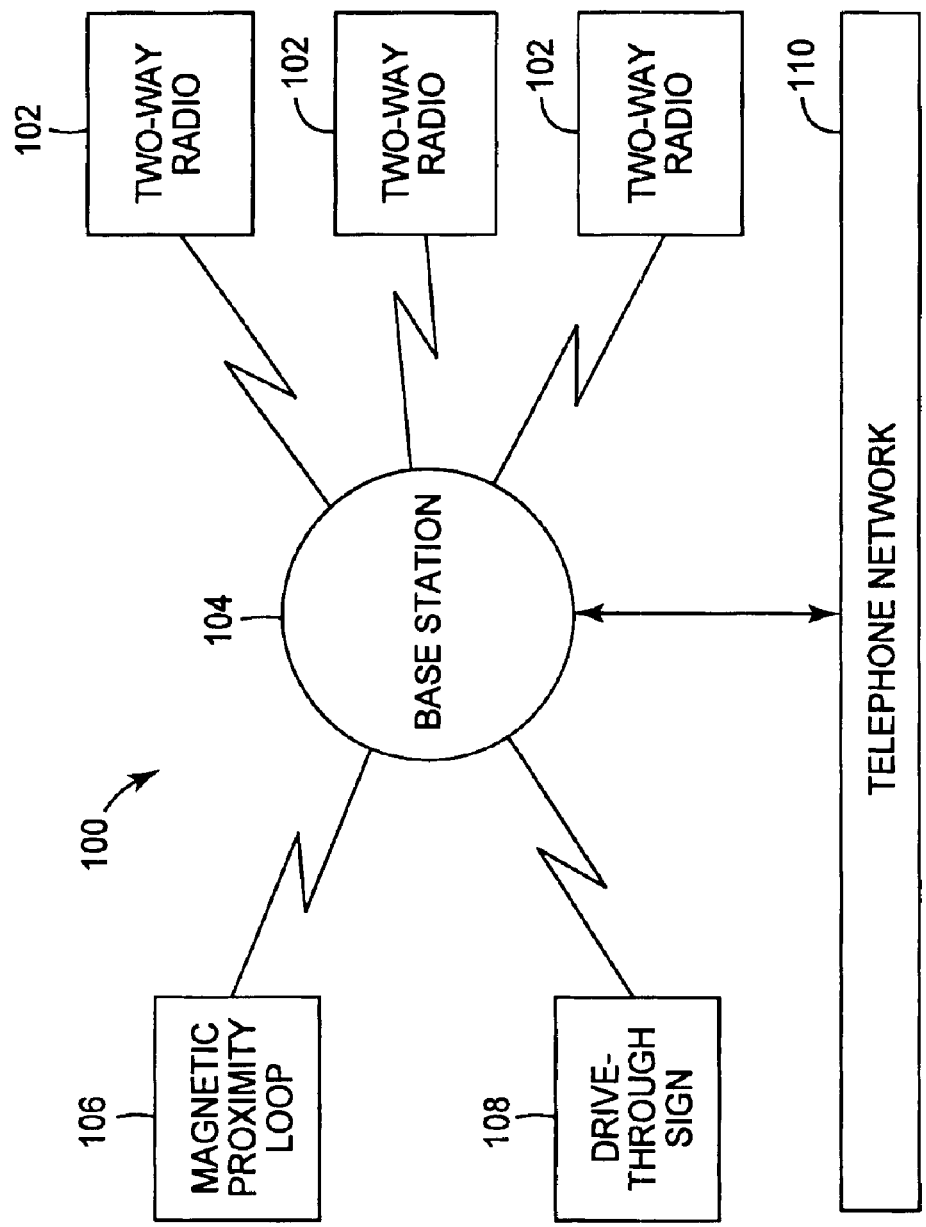
FIG. 1 depicts an embodiment of a radio network, in accordance with the present invention.

FIG. 1 depicts one embodiment of a radio network 100, in accordance with the present invention. As can be seen from FIG. 1, the radio network 100 includes a plurality of two-way radios 102 and a base station 104. None of the radios 102 communicate directly with one another. Instead, each of the radios 102 communicate to the base station 104, which, in turn, relays the communication to the other radios 102. Each of the two-way radios 102 transmits upon a first frequency, $F_1$; each receives signals carried upon a second frequency, $F_2$. The base station 104 functions as a repeater 104, in that it receives the transmissions from the radios 102, carried on frequency $F_1$, and re-broadcasts those transmissions on frequency $F_2$. Thus, the other radios 102 are able to receive transmissions by virtue of the function performed by the base station 104. While a particular radio 102 is broadcasting, it is unable to receive a transmission (its communication is half duplex). Additionally, no form of multiplexing is employed by the radio network 100. Therefore, if two radios 102 transmit simultaneously, their transmissions interfere with each other.

Figure 2:
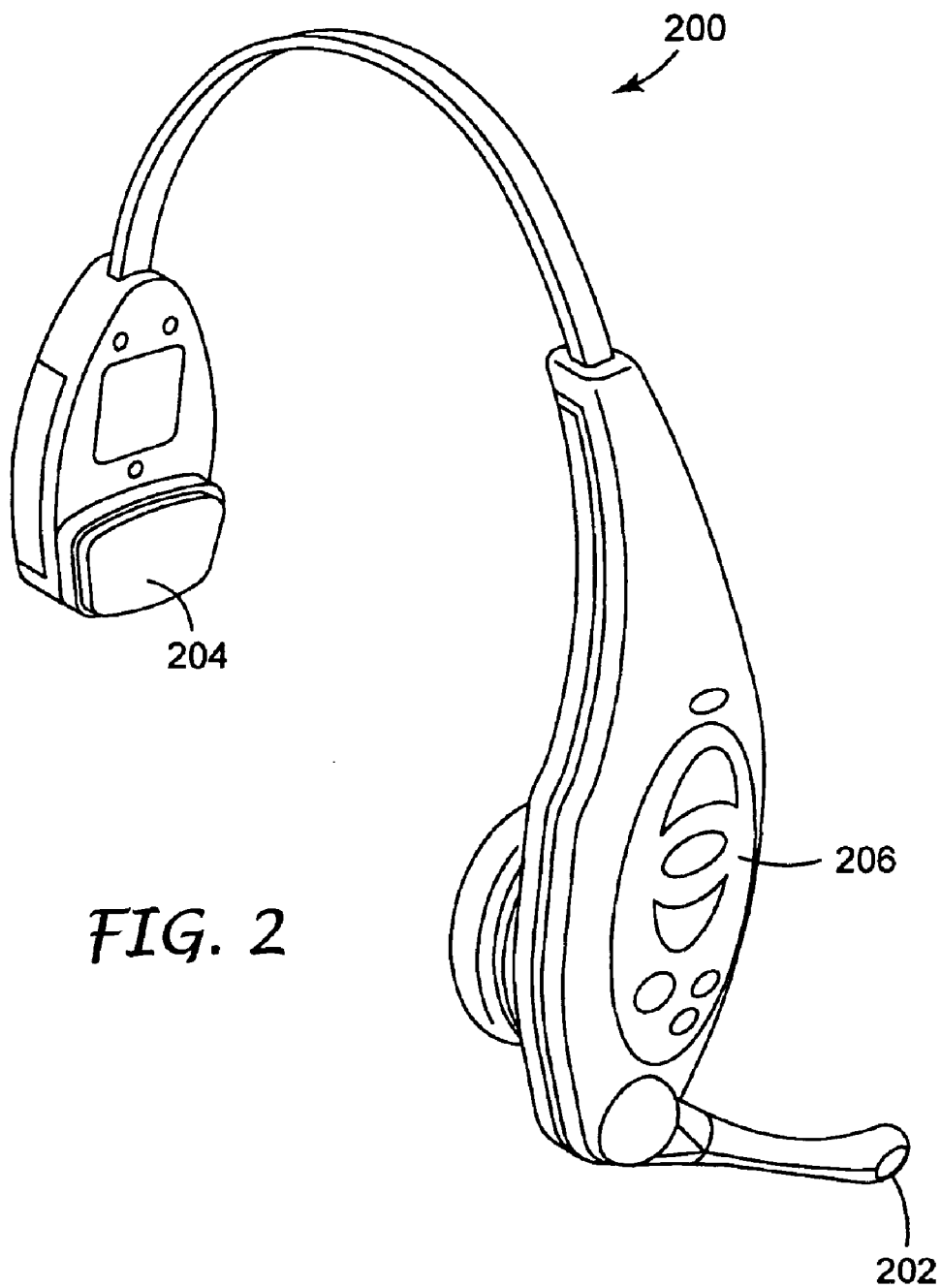
FIG. 2 depicts an embodiment of a two-way radio, in accordance with the present invention.

The radio network 100 depicted in FIG. 1 is of the sort typically found in quick service restaurants, for instance. In this type of setting, each of the two-way radios 102 may be in the form of a headset. An exemplary headset 200 is depicted in FIG. 2. As can be seen from FIG. 2, the microphone 202, speaker 204, and transceiver 206 are affixed to a unit worn upon an employee's head. Other configurations of two-way radios may also be used according to the present invention.

Returning the discussion to FIG. 1, it can be seen that the base station 104 is in communication with a drive through sign 108. The communication between the sign 108 and the base station 104, which allows a drive-through customer to place an order, may or may not be wireless. The base station 104 is also in communication with a magnetic proximity loop 106, buried beneath the pavement of the drive through lane. When a car passes over the magnetic proximity loop 106, a signal is communicated to the base station 104, and the base station 104 generates an alert tone to an employee charged with the task of greeting and taking the order of the drive-through customer. In response to the alert tone, the employee typically greets the customer, and asks for the customer's order. Finally, the base station 104 may interface with a network, such as a telephone network 110, as shown in FIG. 1.

Figure 3:
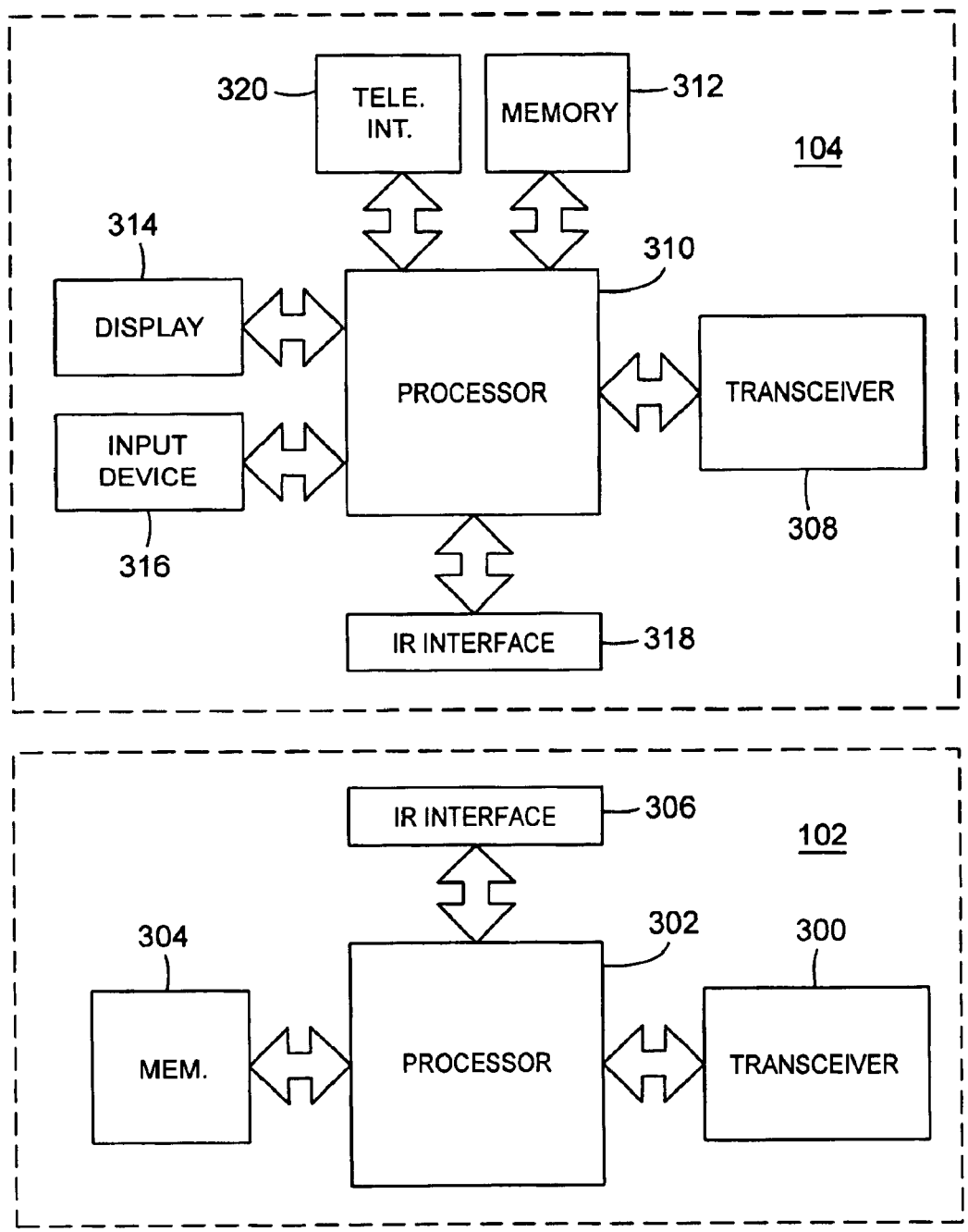
FIG. 3 depicts a schematic block diagram of one embodiment of a base station and radio, in accordance with the present invention.

FIG. 3 depicts a schematic block diagram of a two-way radio 102 and base station 104, in accordance with the present invention. The two-way radio 102 includes a transceiver 300, which accomplishes the task of transmitting and receiving signals upon frequencies $F_1$, and $F_2$ respectively. For purposes herein, the transceiver 300 is also thought to include the circuitry necessary for amplifying and producing an acoustic sound signal to the user of the radio 102. Similarly, the transceiver 300 is thought to contain the circuitry necessary to transduce a sound signal for transmission. A microprocessor 302 controls the transceiver 300. For example, the frequencies $F_1$ and $F_2$ may optionally be commanded by the microprocessor 302. The microprocessor 302 may also control other functions of the transceiver 300, such as volume control. The microprocessor 302 is in communication with a memory device 304, which contains the firmware/software executed by the microprocessor 302. Finally, the microprocessor may be in communication with an infrared (IR) interface 306, which permits data communication with another IR transceiver, as discussed in more detail below. Another data interface may be substituted for the IR interface 306. For example, a cable-based data interface, such as a data interface that operates via a serial port may be used in lieu of the IR interface 306. Except as disclosed herein, the design of the two-way radio 102, including the design of the transceiver 300, the microprocessor 302, the memory device 304, and the IR interface 306, is known in the art.

As can be seen from FIG. 3, the base station 104 also contains a transceiver 308, a microprocessor 310, a memory device 312, and an IR interface 318, each of which functions in accord with the discussion related to the two-way radio 102. Once again, another data interface may be substituted for the IR interface 318. The base station 104 also possesses a display 314 and an input device 316. The display 314 presents information to a user (e.g., an employee of a quick service restaurant). The display 314 may take on any suitable form, such as a liquid crystal display (LCD). The input device 316 permits a user to input information into the base station 104. The input device 316 may take on any suitable form, including, but not limited to, a keypad, a mouse, a trackball, a switch, a button, or a joystick. The display 314 and input device 316 may be integrated into a single unit, as in the case of a touch-screen display. Finally, the base station 104 possesses a network interface 320, which permits the base station 104 to communicate with a network. The network interface may take the form of a network card (such as an ethernet card), or may take the form a phone modem for communication via a telephone network. The base stations in the prior art have not had display devices.

Figure 4:
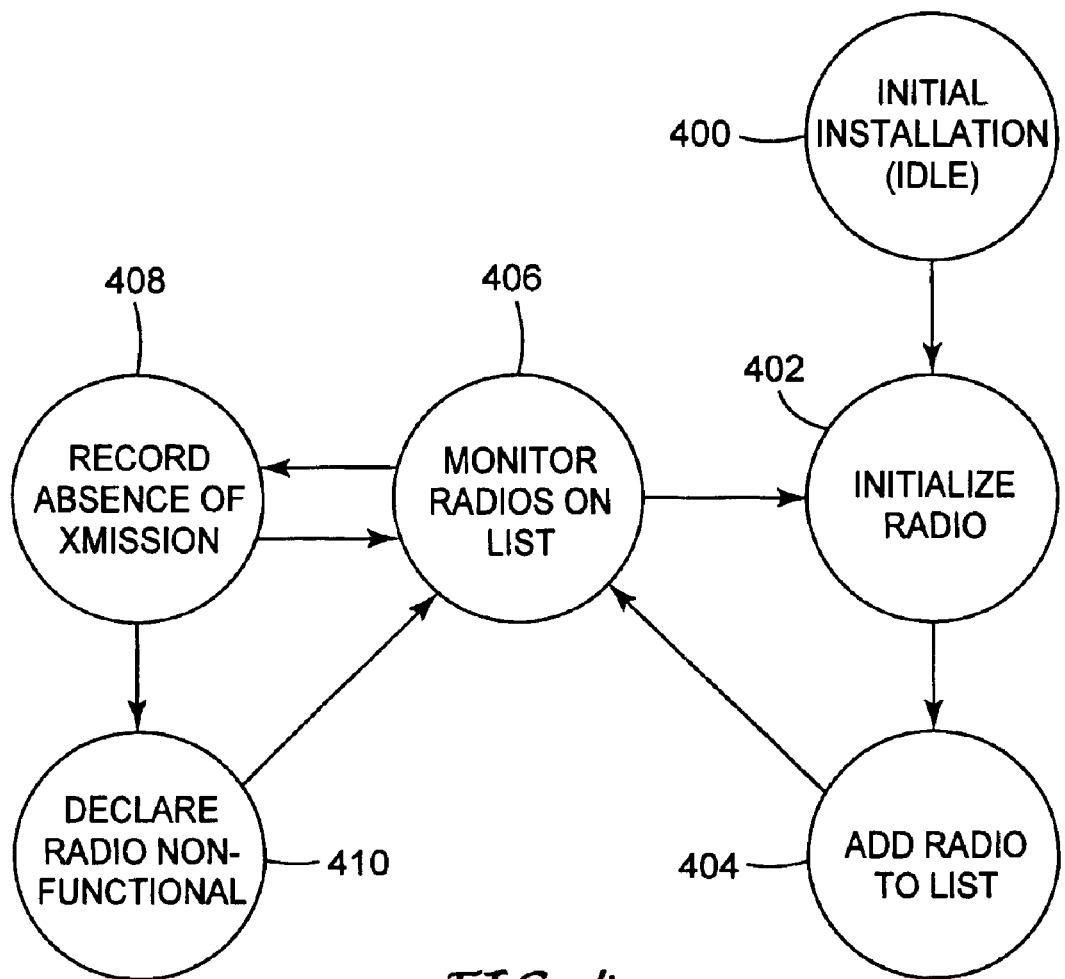
FIG. 4 depicts a state transition diagram describing the behavior of the base station, in accordance with one embodiment of the present invention.

FIG. 4 depicts a state transition diagram, describing the functionality of the base station 104, as it relates to its task of identifying nonfunctional two-way radios 102 within the network 100. The base station 104 performs other functions, such as repeating a signal, which are known in the art and are not reflected in the state transition diagram of FIG. 4. The flow depicted by the state transition diagram is depicted in greater detail in FIGS. 5–8 and 10–11. The methods depicted in FIGS. 4, 5–8, and 10–11 may be embodied in firmware stored in the memory device 312 within the base station 104. Of course, one skilled in the art understands that the aforementioned methods may be embodied in the circuitry of an application-specific integrated circuit (ASIC), as well.

When first installed, the base station 104 is idle with respect to its task of identifying nonfunctional two-way radios 102. This lack of activity is depicted by initial installation/idle state 400. When the base station 104 is first installed in a location, and occasionally thereafter, an initialization process can be used to store, in the memory 312 of the base station 104, a list of identification codes of the two-way radios 102 used with the base station 104. If a new radio 102 is added to the system, the initialization process may be carried out with respect to that new radio 102. Upon the occurrence of an initialization signal, the base station 104 transitions from the idle state 400 to an initialization state 402. The initialization signal maybe instigated by establishing an IR communication link between the base station 104 and a two-way radio 102 (via the IR interfaces 306 and 318), which is discussed in greater detail below. The initialization signal may also be instigated in many other ways, such as by establishing a cable connection between a two-way radio 102 and the base station 104. As described above, in this situation, the two-way radio 102 and base station 104 include a data port (such as a serial port), instead of an IR interface 306 and 318. One purpose of the initialization process is for the base station 104 to communicate basic information needed by the two-way radio 102 for it to conduct communication (e.g., the base station may communicate information regarding the specific frequency values, $F_1$ and $F_2$, used by the base station 104). Another purpose is for the two-way radio 102 to communicate its identity to the base station 104. The two-way radio 102 communicates its serial number and an identification code uniquely identifying the radio 102. In response, the base station 104 transitions to a list entry state 404, and enters the serial number into a list of radios 102 expected to be communicating with the base station 104. The list may be stored as a data array in the memory device 312 of the base station 104. The unique identification code is also entered into a list, and is associated with the serial number. Thereafter, the base station 104 transitions into a monitor state 406.

As will be discussed in greater detail below, execution of the monitor state 406 involves establishing a window of time for each radio 102 entered in the aforementioned list. During the window of time corresponding to a particular radio 102, the base station 104 expects to receive a transmission from that radio 102. Thus, throughout the time window, the base station 104 examines each transmission it receives, extracting an identification code embedded therein. If the identification code matches the one associated with the radio under test, the radio 102 is assumed to be functional, and the base station 104 remains in the monitor state 406. If, however, no such transmission is received, the base station 104 transitions into the record absence state 408. In the record absence state 408, a variable representing the radio's number of absent transmissions is incremented. If the aforementioned variable does not exceed a threshold, the base station 104 transitions back to the monitor state 406, and the base station 104 carries on its monitoring function. If, on the other hand, the variable exceeds the threshold, the base station 104 declares the radio nonfunctional, as shown in state 410. The base station 104 then returns to the monitor state 406, and resumes the monitoring function.

With respect to the state transition flow depicted in FIG. 4, it should be noted that a transition from the monitor state 406 to the initialization state 402 is possible. This transition occurs in response to an initialization signal, which may be instigated by the establishment of an IR link between the base station 104 and a radio 102 to be monitored. If the radio 102 initiating the IR signal is a new radio, its identification code is entered into the list of codes. Thus, it is possible to add, on the fly, a radio 102 to the list of radios to be monitored.

Figure 5:
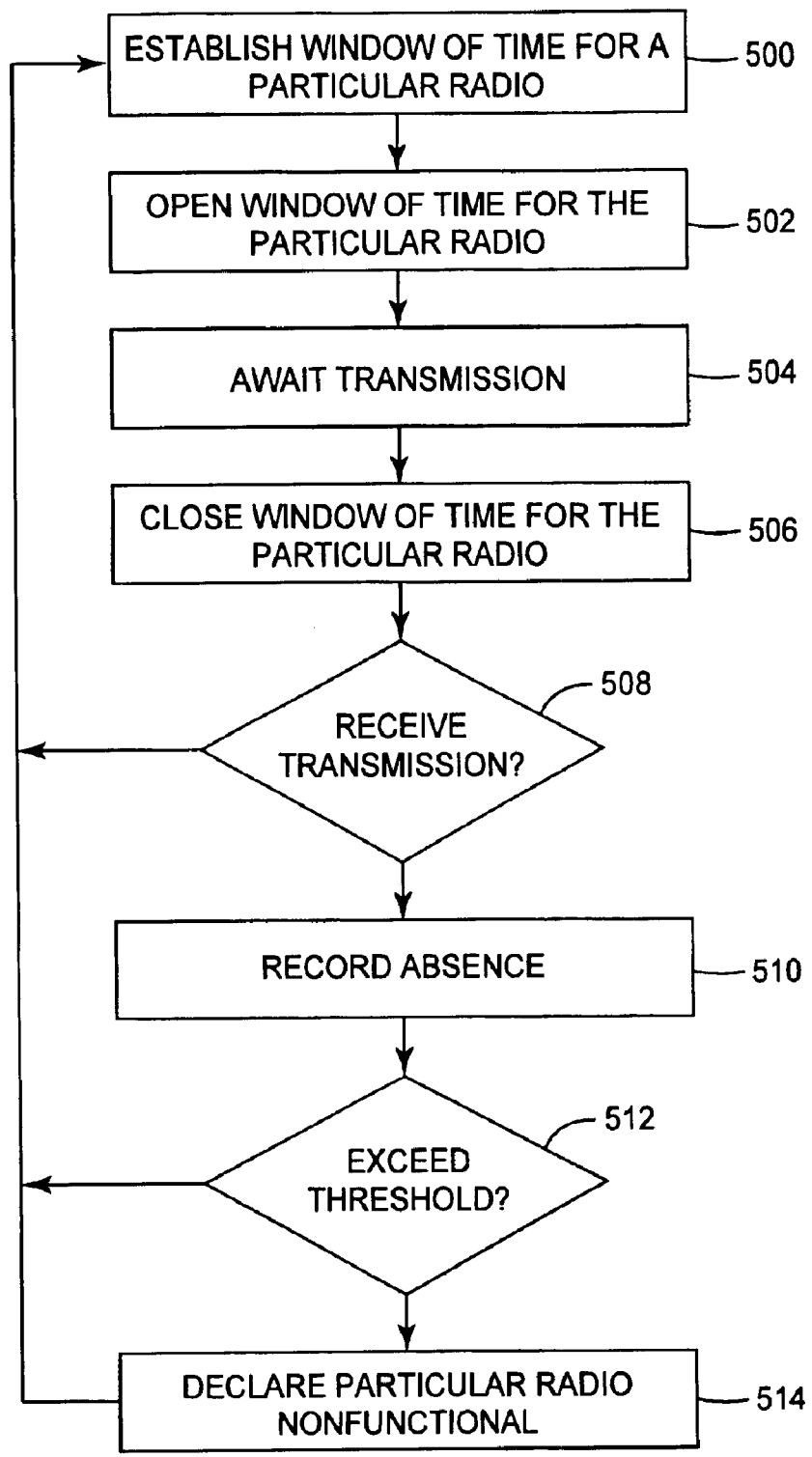
FIG. 5 depicts a flowchart of a method of identifying nonfunctional radios within a radio network, in accordance with, one embodiment of the present invention.

FIG. 5 depicts a more detailed process flow of the operation of the base station 104. The process begins with window establishment operation 500, during which the base station 104 establishes a particular period during which it expects to receive a transmission from a particular radio 102. Next, upon the arrival of the point in time at which the time window is to commence, the window is opened in operation 502. During the pendency of the time window, the base station 104 monitors the transmissions it receives, looking for a transmission from the radio under test, as depicted in operation 504. When the point in time at which the window is to be terminated arrives, the window is closed, as shown in operation 506. Several methods of carrying out operations 500–506 are depicted in greater detail in FIGS. 6–8.

After the close of the time window, it is determined whether a transmission had been received from the radio under test, as shown in operation 508. The return transmission from the radio 102 may contain the identification code as a sinusoid of a pre-defined frequency or as a pre-defined binary signal. If a transmission had been received, control returns to operation 500, and the monitoring loop continues. If no transmission had been received, control flows to operation 510, in which a variable representing the number of absent transmissions of the particular radio is incremented. Next, in operation 512, it is determined whether the aforementioned variable exceeds a threshold. If not, control returns to operation 500, and the monitoring loop continues. If so, the radio is declared nonfunctional, as shown in operation 514, and control returns to operation 500.

Figure 6:
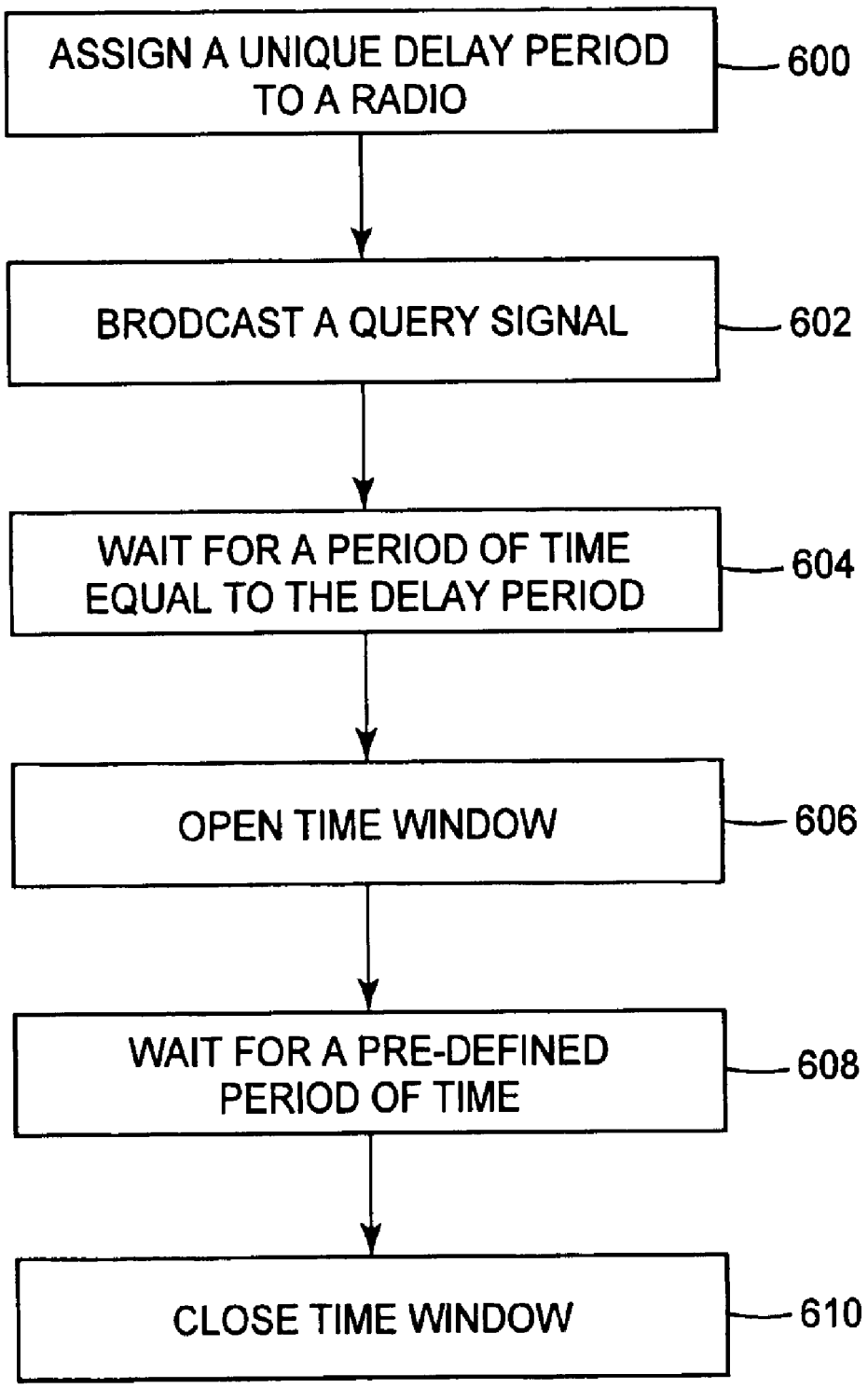
FIG. 6 depicts a flowchart of a method for establishing a window of time for a particular radio within a radio network, in accordance with one embodiment of the present invention.

FIG. 6 depicts one method by which operations 500–506 may be accomplished. The method of FIG. 6 involves assigning a unique delay period to each radio 102, as is shown in operation 600. Operation 600 may be performed during the initialization state 402, depicted in FIG. 4. Next, in operation 602, the base station 104 transmits a query signal. A query signal is a signal that each radio 102 understands as a request for a return broadcast containing the unique identification code (discussed previously with respect to the initialization state 402 of FIG. 4) assigned to the radio. This return broadcast is the means by which the base station 102 determines that the two-ways radios 102 remain functional. The query signal itself may be as simple as a pure tone at a pre-designated frequency carried atop the carrier frequency, $F_2$. Alternatively, the query signal may consist of a binary signal carried atop the carrier frequency, $F_2$. In response to receiving the query signal, a two-way radio 102 responds with a transmission identifying itself. Importantly, per the scheme of FIG. 6, each radio 102 waits for an amount time equal to its uniquely assigned delay period, before broadcasting the return transmission. Thus, each of the radios 102 broadcasts its return signal at a different point in time, thereby avoiding interference between the return broadcasts. Accordingly, after broadcast of the query signal, the base station 104 waits for a period of time equal to the delay period assigned to the particular radio 102 under test. Then, the window is opened, as shown in operation 606. (During the pendency of the window of time, a response from the radio under test is awaited.) After waiting a pre-defined period of time following the opening of the window, the window is closed, as shown in operations 608 and 610, respectively.

Figure 7:
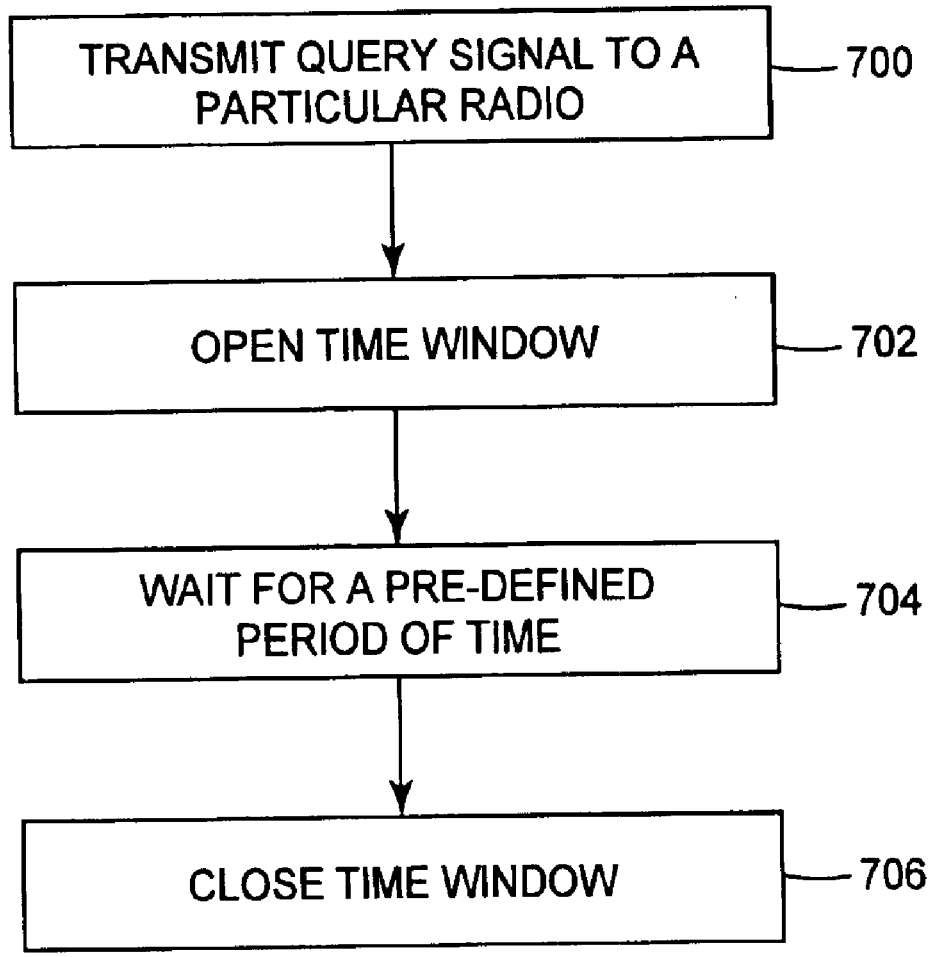
FIG. 7 depicts a flowchart of another method for establishing a window of time for a particular radio within a radio network, in accordance with one embodiment of the present invention.

FIG. 7 depicts another method by which operations 500–506 may be accomplished. The method of FIG. 7 commences with a transmission of a query signal directed toward a particular radio under test, as is shown in operation 700. Given the system of FIG. 1, the transmission will be broadcast carried upon Frequency $F_2$, and will thus be received by all of the two-way radios 102. To direct the transmission to a particular radio 102, the query signal contains a code identifying the particular radio under test. For example, the query signal may include the unique identification code (discussed previously with respect to the initialization state 402 of FIG. 4) associated with the radio under test. Thus, although each radio 102 will receive the query signal transmission, the radio under test will respond (if functional), because the identification code embedded in the query transmission matches the identification code programmed into the radio under test. After transmission of the query signal, the time window is opened, as is depicted by operation 702. (During the pendency of the window of time, a response from the radio under test is awaited.) After waiting a pre-defined period of time following the opening of the window, the window is closed, as shown in operations 704 and 706, respectively.

Figure 8:
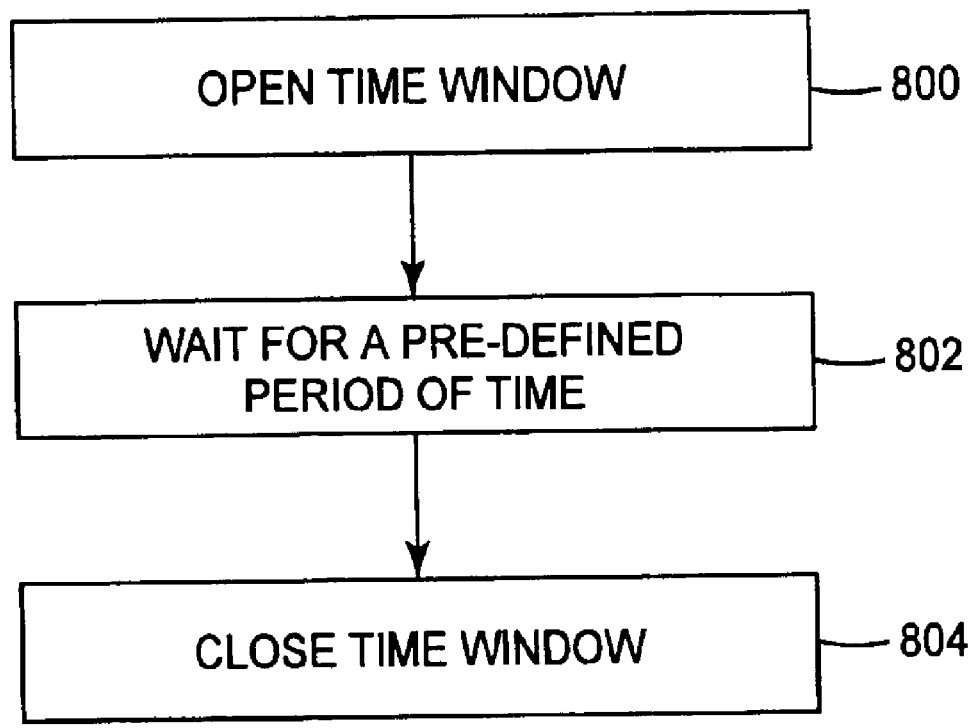
FIG. 8 depicts a flowchart of yet another method for establishing a window of time for a particular radio within a radio network, in accordance with one embodiment of the present invention.

FIG. 8 depicts another method by which operations 500–506 may be accomplished. According to the method of FIG. 8, a window of time is opened periodically (e.g., once per day). During the pendency of the window, at least one transmission is expected from each radio 102. For example, the two-way radios 102 may be programmed to transmit a signal identifying itself, during a power-up routine.

Thus, assuming each radio 102 is powered up at least once per day, a transmission from each radio 102 should be received during the time window.

The method of FIG. 8 commences by opening a time window, as is shown in operation 800. Optionally, this operation may be programmed to occur at a specific time of day (e.g., the window of time is opened at 6:30 AM, when the store/restaurant opens). Next, in operation 802, the base station 104 waits a pre-designated amount of time, during which it expects to receive a transmission from each of the two-way radios 102 entered in its list. The period for which the time window pends may optionally correspond with the hours of the store/restaurant. For example, if the store/restaurant opens at 6:00 AM and closes at 10:00 PM, the window of time may commence at 6:00 AM and pend for 16 hours, until the arrival of 10:00 PM. Finally, as shown in operation 804, the window of time is closed.

With respect to the methods of FIGS. 6, 7, and 8, it should be noted that the two-way radios 102 may possess software, stored in memory device 304, that causes the radio to respond to a query signal with a signal containing the unique identification code (also stored in the memory device 304). The response may be transmitted a single time. Alternatively, the response may be transmitted more than once (e.g., four times), preferably at irregular intervals, so as to reduce the vulnerability to interference stemming from a periodic source (e.g., a 60 Hz. signal from an electrical line).

Figure 9:
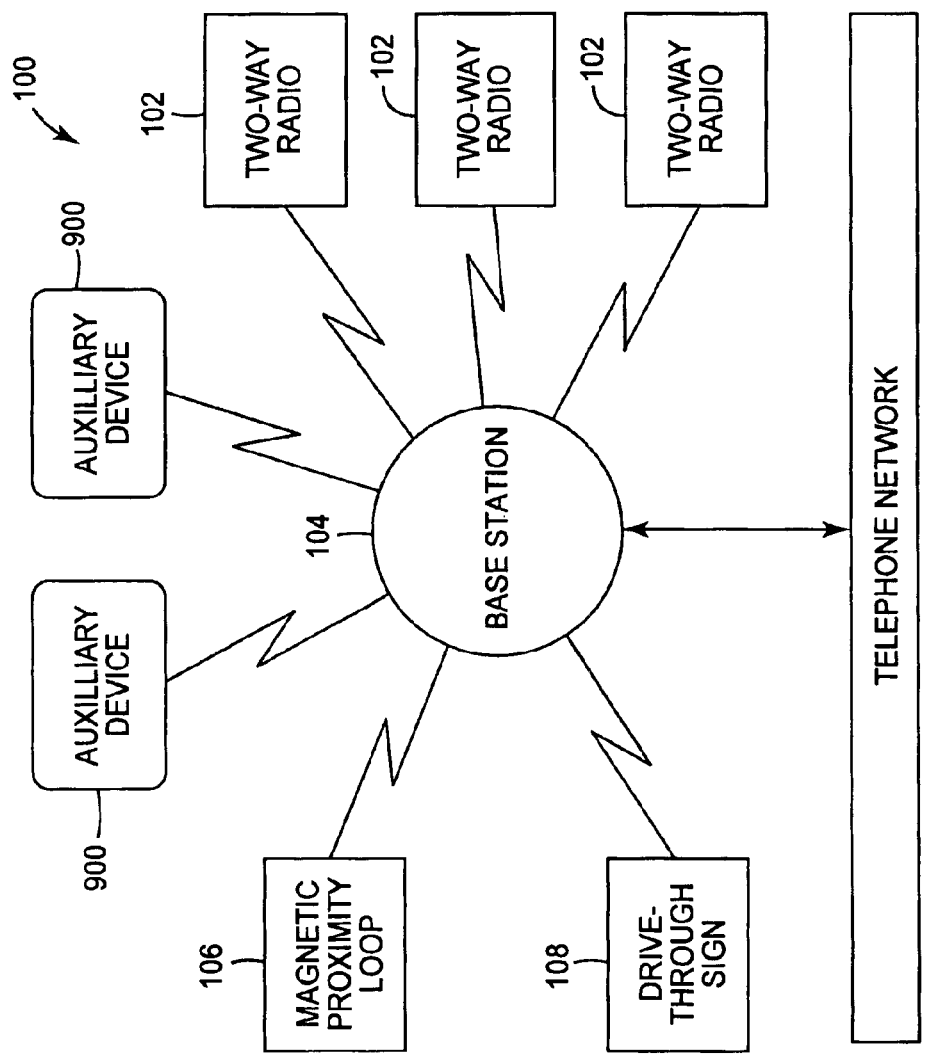
FIG. 9 depicts a radio network, including auxiliary devices, in accordance with one embodiment of the present invention.

FIG. 9 depicts an embodiment of a radio network 101 that includes auxiliary devices 900. The auxiliary devices 900 are other forms of equipment that possess sensors which produce an alarm signal in response to the occurrence of a designated event. The identity of the auxiliary devices 900 vary based upon the setting in which the radio network 100 is deployed. If deployed in a restaurant setting, the auxiliary devices 900 may include a freezer with an over-temperature sensor, a storage facility for meat with a humidity sensor, a circuit breaker box with an electrical current sensor, or a refrigerator with a water sensor. Each of these forms of auxiliary devices 900 (including the sensors) is known in the art. The base station 104 may receive the alarm signals from the auxiliary devices 900, thus eliminating the need for a controller corresponding to each auxiliary device 900. As with the communication between the base station 104 and the drive-through sign 108, the communication between the base station 104 and the auxiliary devices 900 may or may not be wireless. The radio network 101 also includes two-way radios 102 and a telephone network 110.

Figure 10:
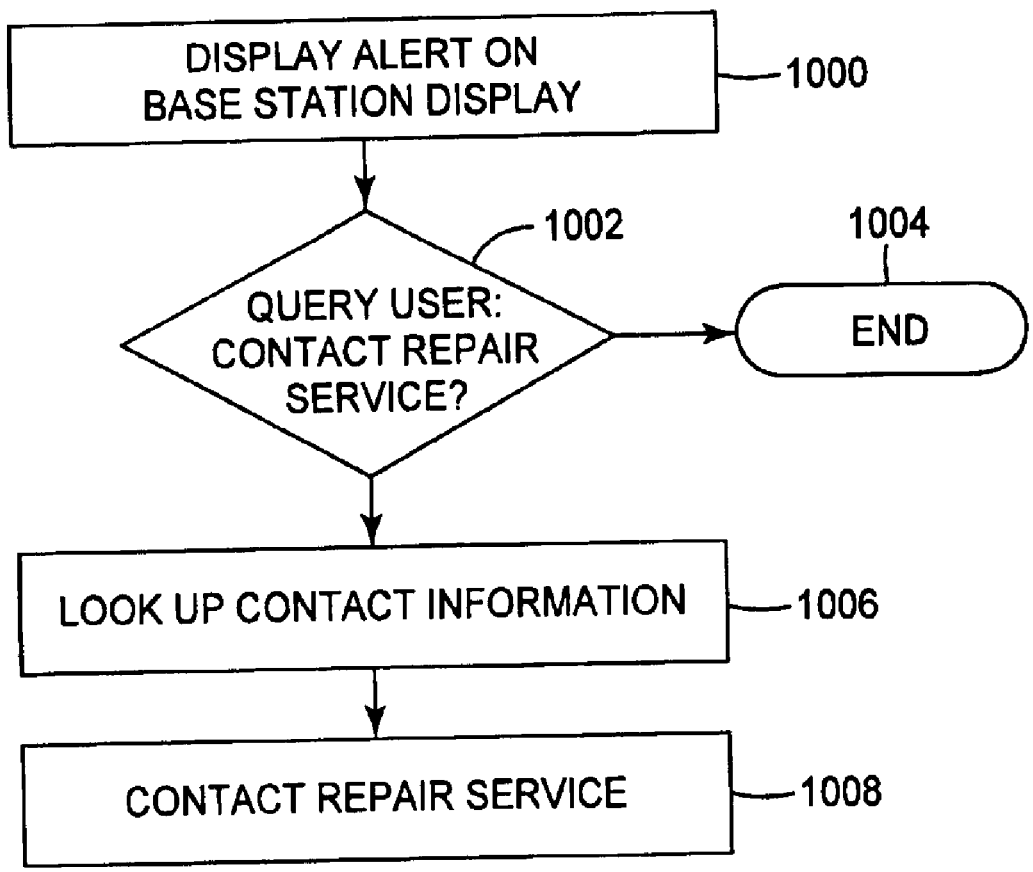
FIG. 10 depicts a flowchart of a method for automating a service request, in accordance with one embodiment of the present invention.

In response to the alarm signal from the auxiliary devices 900, or in response to having declared a particular radio 102 nonfunctional, the base station 104 may be programmed to execute the method depicted in FIG. 10. The method of FIG. 10 may be appended to the method of FIG. 5. In response to an alarm signal from an auxiliary device, or in response to a radio 102 being declared nonfunctional, an alert is presented on the display 314 of the base station 104. For example, the display may present a message reading "Radio serial number ####### appears to have ceased operating. Please service the radio." Preferably, the serial number is printed visibly on the radio 102, so that an employee or repair technician is able to identify the malfunctioning unit via the serial number. Thereafter the base station 104 may query the user, asking whether the base station 104 should contact a repair service, as is depicted in operation 1002. For example, the display may prompt the user: "Would you like a service call placed automatically?" The user responds via the input device 316. If the user responds negatively, the method terminates, as is depicted in operation 1004. If, on the other hand, the user responds in the affirmative, the base station 104 may look up contact information for a designated repair service corresponding to the sort of device determined to have malfunctioned, as is shown in operation 1006. Finally, in operation 1008, the repair service is contacted with the identity of the malfunction radio/auxiliary unit, and directions for scheduling repair. Operation 1008 may take on several forms. For example, the base station 104 may send an e-mail containing the aforementioned information. Alternatively, an alpha-numeric page may be sent. In principle, any form of data transmission suffices. Further, in one embodiment of the present invention, a centralized service is notified of the malfunctioning radio/auxiliary device; the centralized service, in turn, contacts the appropriate repair service. The telephone network 110 or another network is used to contact the repair service. The service or other person that receives the message may call the business establishment at which the base station 104 is located, to confirm that service is desired or to schedule an appropriate time for service.

Figure 11:
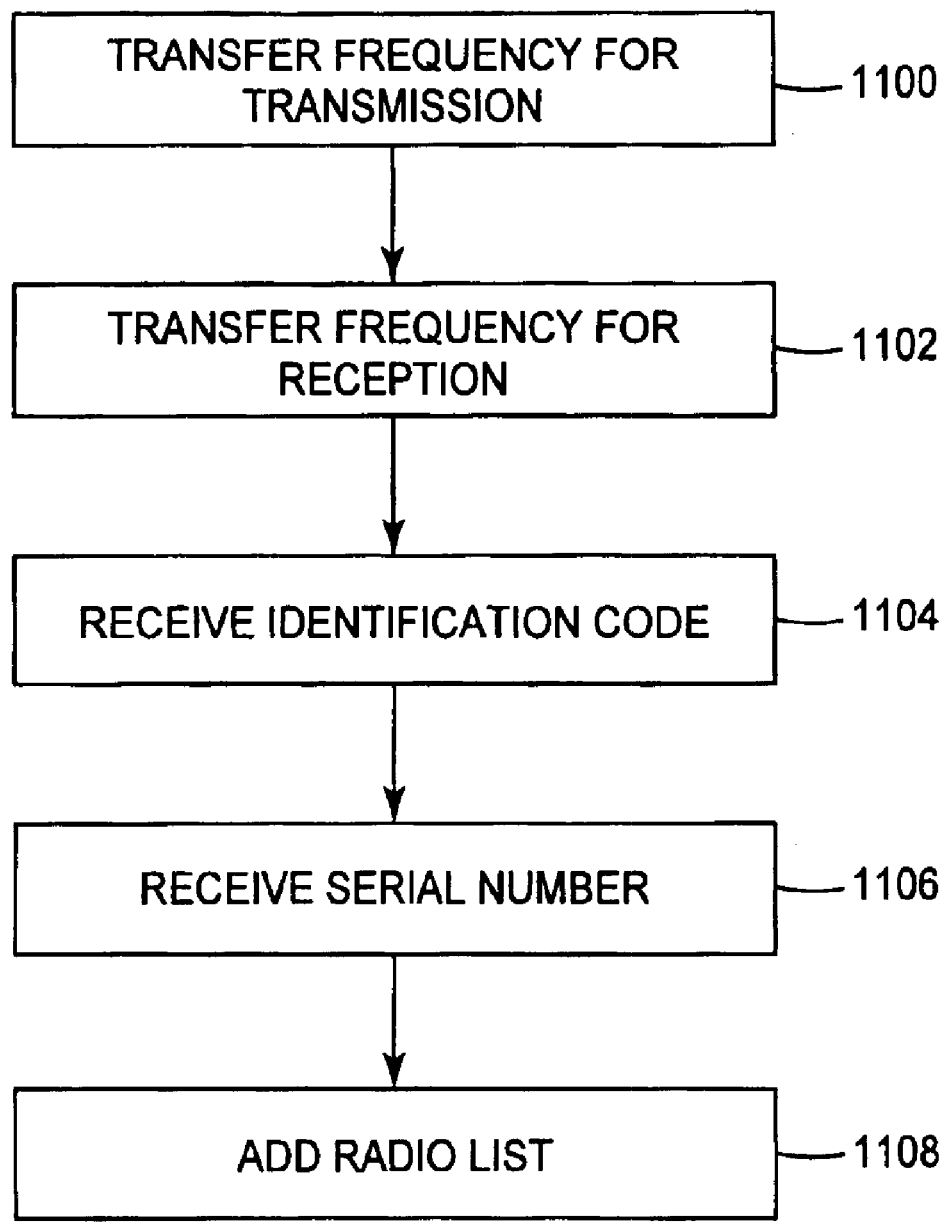
FIG. 11 depicts a flow chart of a method of initializing a radio, in accordance with one embodiment of the present invention.

FIG. 11 depicts an initialization scheme in accordance with one embodiment of the present invention. Execution of the method of FIG. 11 may occur during the initialization state 402 depicted in FIG. 4. As mentioned earlier, initialization is a process by which the base station 104 communicates basic information needed by the two-way radio 102 for it to conduct communication. Additionally, the two-way radio 102 communicates its identity to the base station 104, so that it may be added to the list of radios to monitor for functionality. Initialization may occur in response to an IR communication link being established between the base station 104 and a particular two-way radio 102. The two-way radio 102 may be configured to establish the IR communication link when it is powered on, if it is positioned sufficiently close to the base station 104 to allow IR communication. As depicted in FIG. 11, the initialization method commences by the base station 104 transferring to the radio 102 the carrier frequency upon which the radio is to transmit, $F_1$. This information may be transferred to the radio via an IR link established using the IR interfaces 306 and 318. Next, in operation 1102, the carrier frequency upon which the radio 102 should expect to receive transmissions, $F_2$, is transferred to the radio. Of course, one skilled in the art recognizes that if a different radio network scheme were employed, a different set of initialization data would be transferred to the radio 102 to permit the radio 102 to properly communicate with the network. For example, other information, such as the identity of a spreading code, or timing information regarding an open time slot may be transferred to the radio 102, if necessary for communication with the network.

After receiving the information necessary for proper communication with the network, the radio 102 transfers to the base station information necessary for the base station 104 to monitor the functionality of the radio 102. Specifically, in operation 1104, the identification code that is to be embedded in transmissions from the radio 102 to the base station 104 is transferred to the base station. Next, in operation 1106, the serial number of the radio 102 is transferred to the base station 104. Finally, in operation 1108, the radio 102 is entered into a list of radios to be monitored. This occurs by entering the serial number and identification code of the radio 102 into data arrays stored in the memory device 312. The serial number and identification code are associated in such a manner that identification of one piece of information permits retrieval of the other. The initialization process typically is performed when a system is first installed, or when a new radio 102 is added to an existing system.

The various embodiments described above are provided by way of illustration only and should not be construed to limit the invention. Those skilled in the art will readily recognize various modifications and changes which may be made to the present invention without strictly following the exemplary embodiments and applications illustrated and described herein and without departing from the true spirit and scope of the present invention which is set forth in the following claims.

Want is claimed is:

1. A method of identifying nonfunctional two-way radios from among a known group of two-way radios expected to be operating within a region, the method comprising:
   for each of the two-way radios expected to be operating within the region, assigning a first frequency upon which all of the two-way radios are to receive transmissions;
   assigning a second frequency upon which all of the two-way radios are to broadcast transmissions;
   assigning a unique identification code to each of the two-way radios;
   establishing a window of time that corresponds to each of the two-way radios;
   for each of the established windows of time, awaiting a transmission from the corresponding radio;
   if, for a particular radio, no transmission is detected within its corresponding window of time, recording the absence of the transmission; and
   if, for a particular radio, the number of times absence of transmission has been recorded exceeds a threshold, identifying the particular radio as nonfunctional.

2. The method of claim 1, wherein the step of establishing a time window corresponding to each radio comprises:
   for each of the two-way radios expected to be operating in the region, assigning a corresponding unique delay period;
   broadcasting a query signal;
   following the broadcast of the query signal, for each of the two-way radios, commencing the window of time corresponding to a particular radio, after waiting for the unique delay period assigned to the particular radio to elapse; and
   for each of the two-way radios, closing its corresponding window of time, after waiting for a pre-defined period to elapse.

3. The method of claim 1, wherein the step of establishing a time window corresponding to each radio comprises:
   transmitting a query signal containing a code identifying a particular radio;
   commencing the window of time corresponding to the particular radio, upon transmission of the query signal; and
   closing the window of time corresponding to the particular radio, after waiting for a pre-defined period of time to elapse.

4. The method of claim 1, wherein the step of establishing a time window corresponding to each radio comprises:
   opening a window of time corresponding to all of the radios;
   waiting for a predefined period to elapse; and
   closing the window of time.

5. The method of claim 1, wherein the step of awaiting a transmission from a radio corresponding to a window of time comprises:
   receiving transmissions on a carrier frequency assigned to the radio corresponding to the window of time; and
   inspecting the received transmissions for presence of an identification code corresponding to the radio corresponding to the window of time.

6. The method of claim 5, wherein the identification code is a sinusoid of a pre-defined frequency.

7. The method of claim 5, wherein the identification code is a pre-defined binary signal.

8. The method of claim 1, further comprising:
   upon identifying a particular radio as nonfunctional, issuing an alert.

9. The method of claim 8, wherein issuing an alert comprises presenting a message on a display screen.

10. The method of claim 1, further comprising:
    upon identifying a particular radio as nonfunctional, contacting a repair service; and
    identifying the nonfunctional radio to the repair service.

11. A method of identifying nonfunctional two-way radios from among a known group of two-way radios expected to be operation within a region, the method comprising:
    establishing a window of time that corresponds to each of the two-way radios;
    for each of the established windows of time, awaiting a transmission from the corresponding radio;
    if, for a particular radio, no transmission is detected within its corresponding window of time, recording the absence of the transmission; and
    if, for a particular radio, the number of times absence of transmission has been recorded exceeds a threshold, identifying the particular radio as nonfunctional,
    during an initialization sequence for a particular radio, receiving from the particular radio, a unique identification code to be embedded in the radio's awaited transmission during its corresponding window of time;

receiving a serial number identifying the particular radio; and adding the particular radio's unique identification code and serial number to a list of two-way radios expected to be operating in the region.

12. The method of claim 11, wherein the serial number is printed on the particular two-way radio.

13. A wireless intercom system comprising:

a first two-way radio fashioned as a headset;

a second two-way radio fashioned as a headset; and a repeater unit;

wherein transmissions from the first and second two-way radio occur upon a first carrier frequency;

wherein the first and second two-way radios receive transmissions carried upon a second carrier frequency;

wherein the repeater unit receives transmission carried upon the first carrier frequency, and broadcasts transmissions upon the second carrier frequency, thereby enabling the first and second two-way radios to communicate;

wherein the repeater unit establishes a first window of time corresponding to the first radio and a second window of time corresponding to the second radio;

wherein, the repeater unit awaits a transmission from the first radio during the first window of time, and awaits a transmission from the second radio during the second window of time;

wherein, the repeater unit records absence of transmission from the first radio, if no transmission is received from the first radio during the first window of time;

wherein, the repeater unit records absence of transmission from the second radio, if no transmission is received from the second radio during the second window of time;

wherein, the repeater unit identifies the first radio as nonfunctional if the number of times absence of transmission by the first radio has been recorded exceeds a threshold; and wherein, the repeater unit identifies the second radio as nonfunctional if the number of times absence of transmission by the second radio has been recorded exceeds a threshold.

14. The wireless intercom system of claim 13, wherein:

the repeater unit receives an alarm signal from an auxiliary device other than a two-way radio.

15. The wireless intercom system of claim 14, wherein the auxiliary device is a temperature sensor.

16. The wireless intercom system of claim 14, wherein the auxiliary device is a water sensor.

17. The wireless intercom system of claim 14, wherein the auxiliary device is a humidity sensor.

18. The wireless intercom system of claim 14, wherein the auxiliary device is an electrical current sensor.

19. The wireless intercom system of claim 14, wherein the repeater unit is configured to identify the auxiliary device as nonfunctional upon receiving the alarm signal.

20. The wireless intercom system of claim 19, wherein the repeater unit is configured to present a message on a display screen regarding the auxiliary device, upon the auxiliary device being identified as nonfunctional.

21. The wireless intercom system of claim 19, wherein the repeater unit communicates a request for service, upon identifying the auxiliary device as nonfunctional.

22. The wireless intercom system of claim 21, wherein:

the repeater unit further comprises a modem; and wherein an electronic mail message requesting service is transmitted via the modem, upon identifying the auxiliary device as nonfunctional.

23. The wireless intercom system of claim 21, wherein:

the repeater unit further comprises a modem; and wherein an alpha-numeric page requesting service is transmitted via the modem, upon identifying the auxiliary device as nonfunctional.

24. The wireless intercom system of claim 21, wherein:

the repeater unit further comprises a modem; and a repair service is contacted via the modem, upon identifying the auxiliary device as nonfunctional.

25. The wireless intercom system of claim 14, wherein the repeater unit is programmed to execute the following steps:

assign a first delay period to the first radio and a second delay period to the second radio;

broadcast a query signal to the first and second radios;

open the first time window for the first radio after waiting the first delay period following the broadcast of the query signal;

open the second time window for the second radio after waiting the second delay period following the broadcast of the query signal;

close the first time window after waiting for a pre-defined period to elapse; and close the second time window after waiting for the pre-defined period of time to elapse.

26. The wireless intercom system of claim 14, wherein the repeater unit is programmed to execute the following steps:

transmit a first query signal containing a code identifying the first radio;

open the first time window following the transmission of the first query signal;

close the first time window after waiting for a pre-defined period to elapse;

transmit a second query signal containing a code identifying the second radio;

open the second time window following the transmission of second first query signal; and close the second time window after waiting for a pre-defined period to elapse.

27. The wireless intercom system of claim 14, wherein:

the repeater unit includes a display; and wherein, upon identifying a radio as nonfunctional, a message identifying the nonfunctional radio is presented upon the display.

28. The wireless intercom system of claim 27, wherein:

the repeater unit communicates a request for service upon identifying the auxiliary device as nonfunctional.

* * * * *

UNITED STATES PATENT AND TRADEMARK OFFICE
CERTIFICATE OF CORRECTION

PATENT NO. : 6,993,292 B2  Page 1 of 1
APPLICATION NO. : 10/085480
DATED : January 31, 2006
INVENTOR(S) : Sabongi, Gebran J.

It is certified that error appears in the above-identified patent and that said Letters Patent is hereby corrected as shown below:

Title Page, Column 2, (Other Publications), Line 2 - Delete "2001, ." and insert - - 2001). - -, therefor.

Title Page, Column 2, (Other Publications), Line 7 - Delete "Commerical" and insert - - Commercial - -, therefor.

Page 2, Column 2 - Above COM900BP, Line 1 - insert - - Other Publications - -.

Column 2, Line 50 (approximately) - Delete "with," and insert - - with - -, therefor.

Column 3, Line 19-25 - Delete "Subsequently, the listening device opens------ declared nonfunctional." And insert the same on line 18 after "recorded.".

Column 4, Line 32 - Delete "$F_1$, and $F_2$" and insert - - $F_1$ and $F_2$, - -, therefor.

Column 7, Line 40-42 - Delete "Thus, assuming each radio 102 is ------------ during the time window." and insert the same on line 39 after "routine Column 10, Line 55 (Approximately) - In Claim 11, delete "operation" and insert - - operating - -, therefor Signed and Sealed this Twenty-second Day of August, 2006

JON W. DUDAS
*Director of the United States Patent and Trademark Office*